INVENTORS
HENRY L. BLUST
HENRY A. STRYCH &
GEORGE VIVIAN
BY William A. Zalesak
ATTORNEY

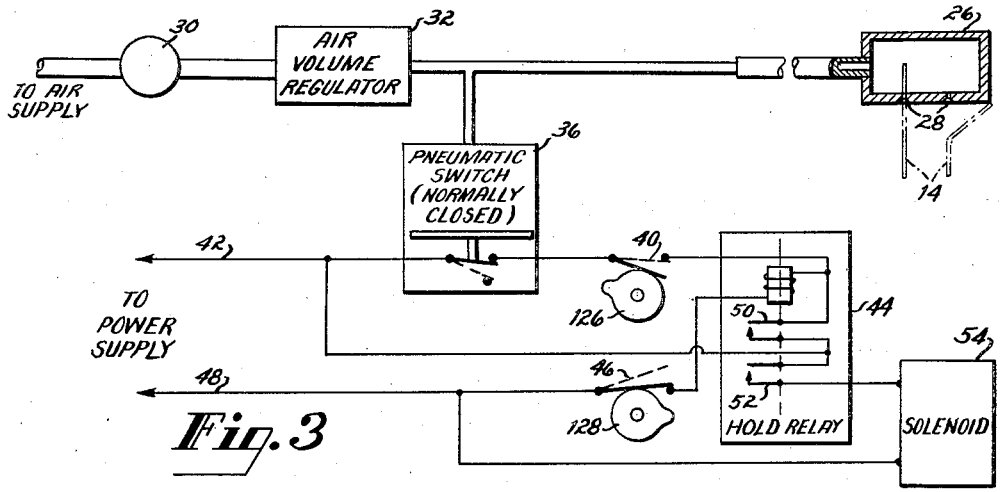
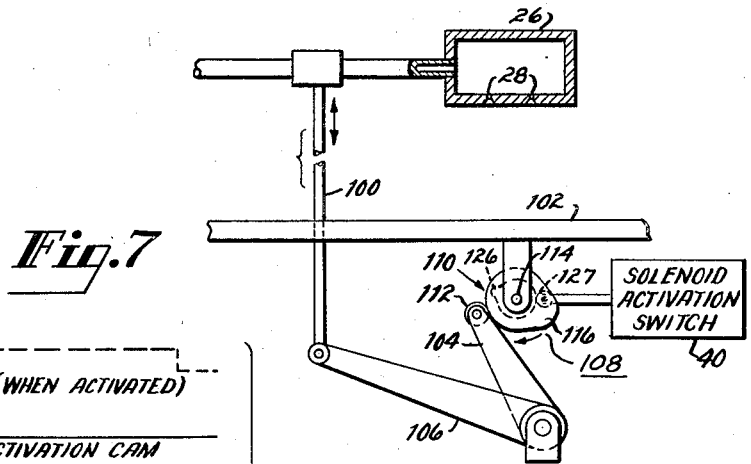

INVENTORS
HENRY L. BLUST
HENRY A. STRYCH &
GEORGE VIVIAN
BY William A. Zalesak
ATTORNEY

2,902,149

PNEUMATIC DETECTING AND SORTING APPARATUS

Henry L. Blust, Lyndhurst, Henry A. Strych, Clifton, and George Vivian, Westfield, N.J., assignors to Radio Corporation of America, a corporation of New York Application September 29, 1955, Serial No. 537,322

6 Claims. (Cl. 209—72)

This invention relates to improvements in detecting apparatus. In particular, it relates to a detecting device responsive in differences in air pressure therein to the presence and absence of a workpiece of desired physical characteristics from an operating position. Such differences in air pressure produce forces of different magnitude that may be used for performing any desired control function. While not limited thereto, the detecting device of the invention is described herein in connection with an electron tube stem making machine having lead-in wires extending thereinto, the detecting device serving to control the machine differently when one or more of the lead-in wires is missing than when all of them are present.

Heretofore, for detecting a missing workpiece or a workpiece that is imperfect in that it departs from the aforementioned desired physical charateristics, such as a bent or short electron tube stem lead-in wire in an array of wires to be acted on by a stem making machine, resort has been had to electrical microswitches responsive to the contact pressure of a feeler switch member against each of the lead-in wires. Such switches, however, are relatively delicate and easily go out of order.

Accordingly, one object of the invention is to provide improved apparatus for detecting the presence or absence of a desired workpiece from a position related to the apparatus.

Another object of the invention is to provide improved apparatus for detecting the absence of the required number of perfect lead-in wires in an array of such wires during their processing in an electron tube stem-making machine.

The foregoing and related objects are achieved in accordance with the invention by the provision of pneumatic detecting apparatus which comprises a hollow head having at least one passageway extending from the inside to the outside of the head. A portion of the head adjacent to the passageway is adapted to engage a workpiece for at least partially sealing the passageway. The head is adapted to be connected to a source for providing the inside of the head with an air pressure different from that on the outside of it. Thus an air pressure switch of a type responsive to a pressure between that of the air source and that of the air outside the head, and connected to the inside of the head, is adapted to be actuated by the presence of a workpiece adjacent to the passageway.

The invention is described in greater detail in connection with the accompanying five sheets of drawings wherein like numerals refer to like parts, and wherein:

Fig. 3 is a schematic view of some of the mechanisms employed in the apparatus of Fig. 1;

Fig. 7 is a partially schematic view of a portion of the pneumatic detecting device of the invention;

Figure 1:
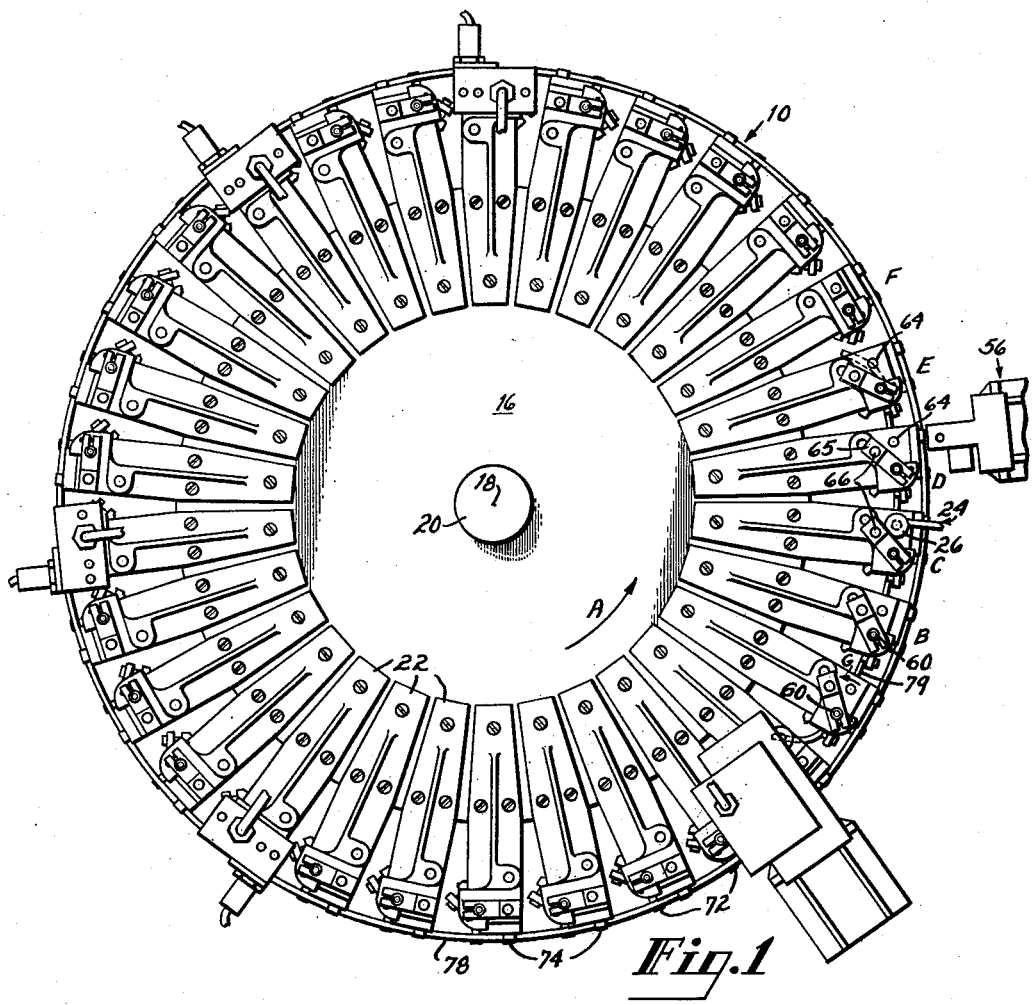
Fig. 1 is a top plan view of a portion of apparatus for making electron tubes stem and embodying the invention.
Figure 9:
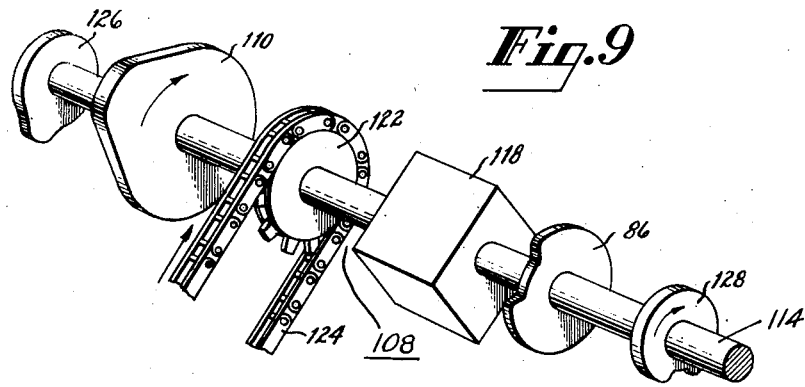
Figure 10:
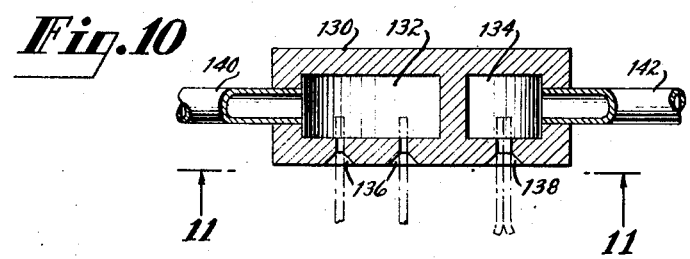
Figure 11:
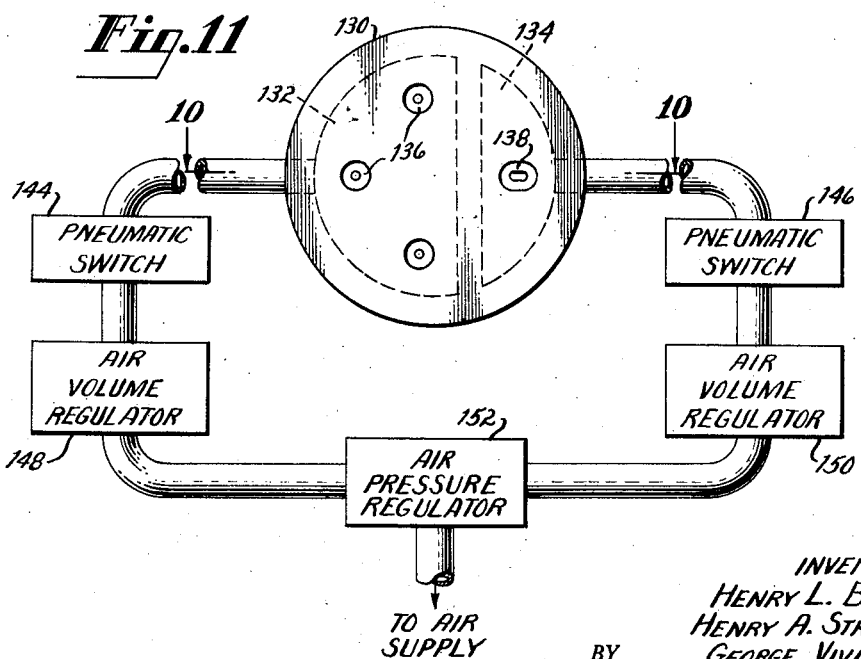

Figs. 8 and 9 schematically depict driving means for the apparatus shown in Fig. 1;

Fig. 10 shows a portion of a pneumatic detecting device according to another embodiment of the invention and taken along line 10—10 of Fig. 11; and Fig. 11 is a sectional view taken along line 11—11 of Fig. 10 and illustrates schematically some of the mechanisms used in connection with this embodiment.

Figure 2:
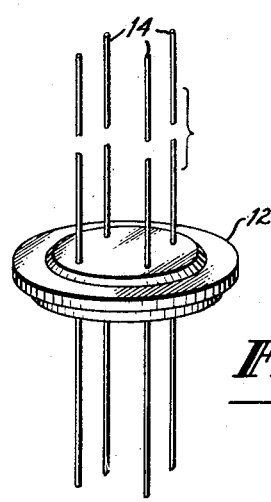
Fig. 2 is a perspective view of an electron tube stem of the sub-miniature variety and made by the apparatus depicted in Fig. 1.

Referring now to the drawings in greater detail there is shown in Fig. 1 a top plan view of a portion of a machine 10 for making electron tube stems and embodying the invention. Each of the electron tube stems, one of which is illustrated in Fig. 2 commonly includes a moldable member 12 of an insulating material such as glass. There is sealed to the moldable member 12 a plurality of metallic members such as lead-in wires 14. Such a stem is usually formed from a glass tube (not shown). The practice usually followed in making the stem is to dispose a plurality of lead-in wires within the glass tube and then form the tube to a button-like shape. The tube is formed to the button-like shape by heating the tube to a relatively soft plastic state, by directing fires to it, and then pressing the soft glass by die or molding members to flatten the tube and seal it to portions of the lead-in wires.

The machine 10 for making such electron tube stems comprises a turret 16 of substantially circular shape and mounted for rotation about a vertical axis 18. The turret is supported in a horizontal plane by a shaft 20. The turret is provided with a plurality of vertically disposed processing or mold assemblies 22 regularly spaced in a circle concentric with the turret 16 and adjacent to its outer periphery. The turret is intermittently rotated in the direction indicated by the arrow A in Fig. 1 through a plurality of equal arcs of predetermined angular extent by indexing apparatus which will be described in further detail in connection with Fig. 8. Therefore, during its cycle of operation the turret traverses a plurality of stations, some of which are lettered B through F in the drawing. At successive stations different processing operations are performed. The successive processing steps performed are similar to those described in detail in copending application Serial No. 485,190, filed January 31, 1955, of Pierre Maurer, now Patent No. 2,857,711 and assigned to the same assignee as the present invention.

Figure 5:
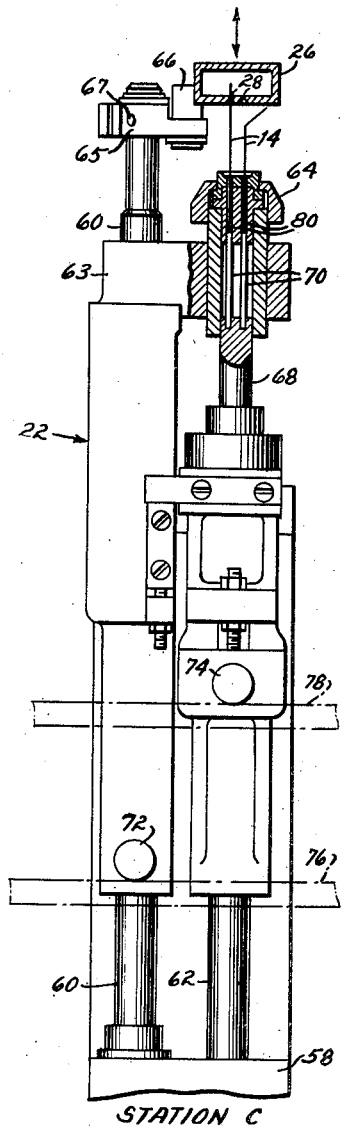
Figs. 5 and 6 are partially cut-away front elevational views of a mold assembly of the apparatus of Fig. 1 in, respectively, two successive processing stations.

According to the invention, there is provided at one of the processing stations referred to (station C as shown in Fig. 5 in the drawings) a pneumatic detecting device 24 which includes a hollow workpiece detector head 26 (Figs. 1, 5, and 7) having a plurality of passageways 28 each extending from the inside to the outside of the head. The head 26 is movably mounted to engage, in the passageways 28, lead-in wires 14 supported in the workpiece holding mold assembly 22 of the electron tube stem making machine 10. Such engagement closes the passageways 28 and provides a given air pressure in a system to be described and indicates that all required lead-in wires are present. If one lead-in wire 14 in the required array is bent or missing, a passageway 28 is left open to the atmosphere. This produces a reduced pressure in the system. The reduced pressure causes the activation of a mechanism which ejects the entire array of wires of that processing assembly. This prevents the production by the machine 10 of electron tube stems having bent or missing lead-in wires. Thus, the machine produces stems having only prefect lead-in wires, that is, lead-in wires having the desired physical characteristics.

Reference is now made to the schematic illustration of Fig. 3. A source of air under an appreciable pressure above that of the atmosphere, say over 15 pounds per square inch, is fed into an air pressure regulator 30. The air pressure regulator 30 is used to adjust the pressure of the incoming air to the desired pressure, for example, to 15 pounds per square inch. After passing through the air pressure regulator 30, the air is fed through an air volume regulator 32 which permits an adjustment of the quantity of air flowing through it and also prevents air back-pressure from interfering with the air pressure control of the regulator 30. Since air pressure regulators and air volume regulators are well known in the art no further description of them will be given. Air from the air volume regulator 32 is fed to the workpiece detector head 26 where the air passes out to the atmosphere through the passageways 28. Each of the passageways 28 in the head 26 is adapted to receive an electron tube stem lead-in wire 14 when the head is in operation during a detection period in the operation of the stem making machine 10. During its period of operation the workpiece detector head 26 is moved down onto the lead-in wires 14 until the lead-in wires enter the passageways 28 thereby restricting the air flow from the inside of the head to the atmosphere. This builds up back pressure within the head. The back pressure is also built up in a normally closed pneumatic switch 36 which, with the head 26, is connected pneumatically in parallel with the air volume regulator 32. The back pressure in the switch 36 actuates the switch causing it to open. The opening of the switch prevents the operation of a lead-in wire ejecting mechanism to be described.

In the event the head 26 does not encounter a lead-in wire 14 in each of the passageways 28, an insufficient back pressure is built up within the pneumatic switch 36 for it to open. After the head 26 has failed to engage the proper number of perfect lead-in wires a first cam operated switch (solenoid activation switch 40), in electrical series with the pneumatic switch 36, is momentarily actuated closing their common circuit. Electricity from a power supply (not shown) may thus pass from one side 42 of the power supply through the pneumatic switch 36, the cam operated switch 40, and through a double-pole normally-open hold relay 44, and back through a normally-closed second cam-operated switch (solenoid release switch 46) to the other side 48 of the power supply. This flow of current closes both sets of contacts 50 and 52 of the hold relay 44. The first set of contacts 50 serves as a locking switch which locks the hold relay 44 in an on position. The relay 44 thus by-passes the pneumatic switch 36 and the first cam operated switch 40. The second set of contacts 52 completes a circuit from the same power supply to a solenoid 54. This solenoid 54, while activated, serves as a memory mechanism for carrying the information that the pneumatic switch 36 has remained closed and thus memorizes the fact that an insufficient number of perfect lead-in wires was encountered by the detector head 26 during its last period of operation. The memory thus provided is used during a subsequent period in the operation of the stem making machine 10 for the activation of a mechanism 56, described below in connection with Figs. 4 to 6, which actuates workpiece ejector members 68 for ejecting the fewer than desired number of perfect lead-in wires. At a predetermined time after the memory provided by the solenoid 54 is consulted, the second cam operated switch 46 is momentarily opened. The momentary opening of the second cam operated switch 46 de-energizes the hold relay 44 and thus erases the memory in the solenoid 54.

Figure 4:
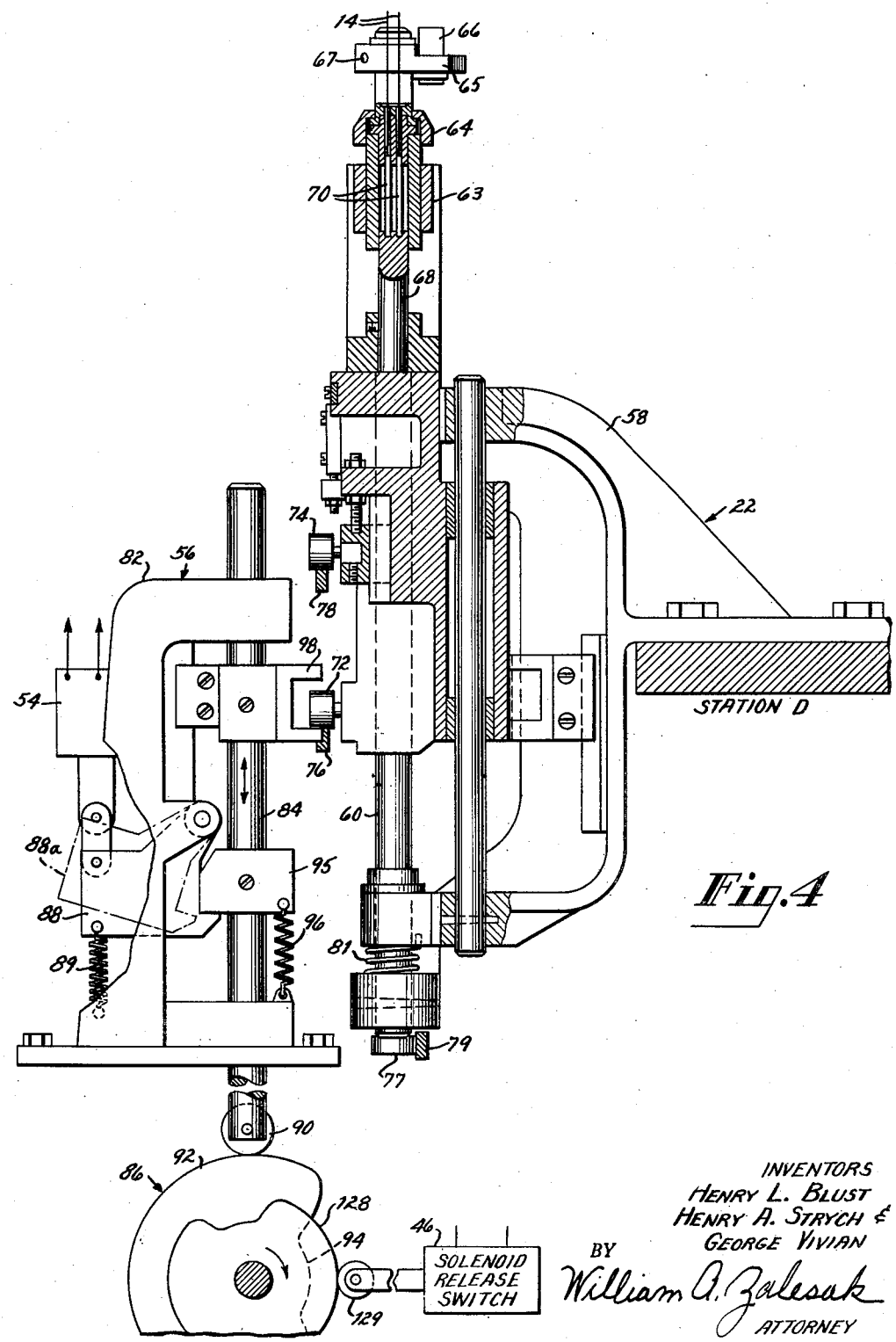
Fig. 4 is a partially cut-away side elevational view of some of the mechanisms of the apparatus of Fig. 1.
Figure 6:
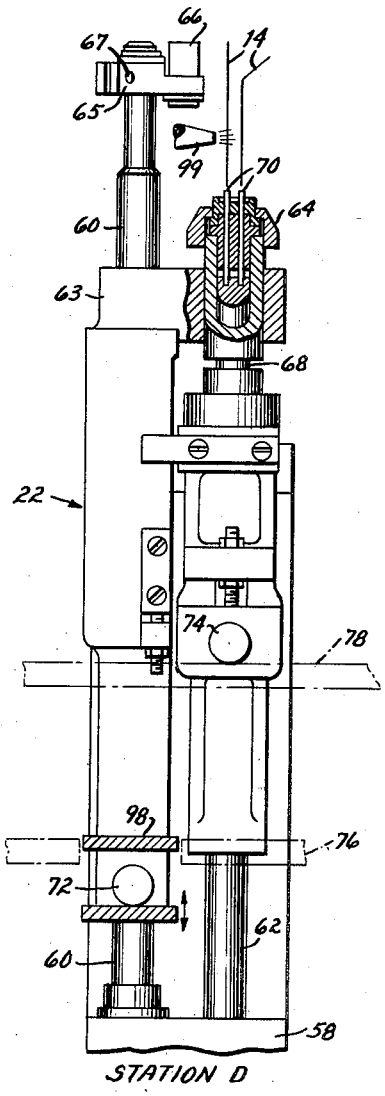

Referring now to Figs. 4, 5, and 6 there is shown a mold assembly 22 which holds an array of lead-in wires 14 in a desired order for use in making, together with a glass member (not shown), a stem of the type shown in Fig. 2. The assembly 22 includes a C-shaped frame 58 in which are mounted a first and a second shaft 60 and 62. As is described in detail in the aforementioned copending application Serial No. 485,190, the first shaft 60, which is rotatably mounted, supports a pair of arms 63 and 65 which in turn support, respectively, a pair of mold members 64 and 66. The upper arm 65 is fixed to the first shaft 60 by means of a screw 67. Thus the upper arm 65 is pivotally supported for rotational movement with the shaft 60 around the shaft axis. The lower arm 63 is slidably mounted on the shaft 60 for vertical movement thereon. The second shaft 62 supports an ejector member 68 having lead-in wire ejecting members or fingers 70.

Two cam rollers 72 and 74, riding respectively on two stationary cam tracks 76 and 78, are employed to move different parts of the mold assembly 22 in order to effect a molding operation and a lead-in wire ejecting operation.

The lower cam roller 72 rides on the lower cam track 76. This cam roller 72 is, through the lower arm 63, fixed to the lower mold 64. Consequently, the vertical position of the lower cam track 76 determines the vertical position of the lower mold 64. Since the other mold, the upper one 66, is fixed in a constant vertical position, the vertical position of the lower mold 64 determines the relative positions of the molds with respect to each other. Consequently, the desired molding operations may be effected by moving the lower cam roller 72 in a vertical direction at the desired periods of time.

In order to provide access to the lower mold 64 during the travel of the mold assemblies 22 through the detecting and ejecting stations C and D, the upper mold 66 may be swung to one side, in direction G in Fig. 1, and out of axial alignment with the lower mold 64. The movement of the upper mold 66 out of its position over the lower mold is accomplished by a third cam roller 77 (Fig. 4) which is fixed to, but radially spaced from the axis of, the first shaft 60. A third cam track 79 is positioned in an engageable relation with the third roller 77 and extends along the initial stations, B through E. As shown in Figs. 1 and 4, when the mold assemblies 22 are moved to the initial stations the third rollers 77 of the mold assemblies engage the third track 79. The third track moves the third rollers in a direction rotating the upper mold arm 66 in direction G. When the mold assemblies 22 leave station E the third rollers no longer engage the third track. A spring 81, connected between the C-frame 58 and the shaft 60, then returns the upper mold 66 into alignment above the lower mold 64.

The ejection of lead-in wires 14 from the machine 10 is effected by relative movement between the lower mold 64 and the ejector member 68. The upper cam roller 74 is fixed to the lead-in wire ejector member 68. Thus the upper track 78 maintains the ejector member 68 at the desired vertical position. The ejecting fingers 70 of the ejector member 68 extend upwardly into apertures 80 in the lower mold 64, one ejecting finger 70 for each of the apertures 80 in the lower mold 64. The ejecting fingers 70 are adapted to be moved upwardly and completely through the apertures 80 for ejecting the lead-in wires from the lower mold. If the lower mold 64, which has its vertical position determined by the lower cam roller 72, is moved downwardly with respect to the upper cam roller 74 (Fig. 6), the lower mold 64 moves downwardly with respect to the ejector member 68. This, in effect, is the same as if the ejector member 68 moved upwardly into the mold 64. Consequently, when the lower cam roller 72 is moved downwardly, as will be described in connection with a description of the ejector mechanism of Fig. 4, the fingers 70 are in effect moved upwardly through the apertures 80 in the lower mold 64. This effects an ejection of a lead-in wire array having less than the required number of perfect lead-in wires.

In Fig. 4 there is illustrated the ejector member actuating apparatus or mechanism 56 for ejecting the lead-in wires 14 from a mold assembly 22. The ejector mechanism 56 includes a frame 82 which is fixed in position with respect to the vertical position of the mold assemblies 22. The frame 82 supports within it a shaft 84 which is slidably mounted for movement in a vertical direction. The vertical position of the shaft 84 is determined by two members. These members are: first, an ejector lowering cam 86, and second, a locking member 88. The locking member 88 is biased in a locked-in position by a spring 89 connected between a lower portion of the frame 82 and the locking member. The lower end of the shaft 84 terminates in a cam roller 90 which rides on the ejector lowering cam 86. During the rise portion 92 of the ejector lowering cam 86 the cam supports the shaft 84. The shaft 84 is supported in its lowermost position only when both the dwell portion 94 of the cam 86 is positioned adjacent to the cam roller 90 and the locking member 88 is in a locked-out position, the position indicated by the dotted outline 88a. When the locking member 88 is in a locked-in position, and this member engages a stop 95 which is fixed to the shaft, the locking member prevents the shaft from being lowered to the dwell portion of the cam. The locking member is controlled by the solenoid 54. When the solenoid is in its activated position the locking member is pulled to its locked-out position and is thus pulled away from the stop 95. This allows the shaft 84 to lower and ride on the dwell portion 94 of the cam 86 when the cam roller 90 reaches the dwell portion. A spring 96, connected between the frame 82 and the stop 95, insures that the shaft 84 rides on the dwell portion of the cam 86 during the locked-out position of the locking member 88.

A yoke 98 is fixed to the shaft 84 and is engageable with the lower cam roller 72 of the mold assembly 22. The yoke 98 takes the place of a portion of the lower cam track 76 as shown in Fig. 6. As has been indicated above, when the lower cam roller 72 of the mold assembly 22 is moved to a lower vertical position than that of track 76, the fingers 70 of the ejecting member 68 are in effect moved upwardly and eject lead-in wires from the mold. Since the position of the lower cam roller 72 at station D (Fig. 6) is determined by the vertical position of the yoke 98, a lowering of the yoke effects the ejection of lead-in wires from the mold. A nozzle 99, which is connected to a source (not shown) of air under pressure, blows the ejected wires 14 away from the mold assembly 22 and into a receptacle (not shown) adapted to receive the ejected wires.

Figure 7 illustrates the means by which the detector head 26 is lowered into engagement with lead-in wires 14 held in the lower mold 64 (Fig. 5) of the mold assembly 22. The detector head 26 is supported at station C of Fig. 1 on an alignment shaft 100 which is slidably supported for vertical movement with respect to a fixed frame 102. The shaft 100 is fixed to first and second power transfer arms 104 and 106 which transfer power from driving means 108 (described in connection with Fig. 9) through a detector head lowering cam 110 and a cooperating cam follower or roller 112. The lowering cam 110 is rotatable by a drive shaft 114 to which it is fixed. When the cam 110 is rotated to the position where the roller 112 enters a cam rise portion 116, the first power transfer arm 104 is moved away from the cam causing the second power transfer arm 106 to be lowered. The downward motion of the second arm 106 is transmitted to the shaft 100 lowering the detector head 26. When the cam roller 112 is moved into the dwell portion of the cam, by the continued rotation of the drive shaft 114, the head 26 is raised.

Figure 8 is a chart illustrating the timing of the relative motions of the several mechanisms of the stem-making machine. The horizontal extensions of the graph lines in the chart, in the direction indicated by the legend adjacent to graph line e entitled "Drive Shaft Rotation," indicate the relative positions of the several mechanisms and the timing of their periods of operation with respect to each other. It will be appreciated that the duration of the active periods of the mechanisms may be lengthened or shortened provided the relative timing of the mechanisms is not substantially altered. The extended portion of each of the graph lines, in the direction indicated by the arrow adjacent to the legend entitled "Active Period of Each Drive," indicates only the fact that the power transfer means represented by the graph line is active for the duration of the extended portion.

As shown in Fig. 9, the driving mechanism 108 includes a drive shaft 114 having a sprocket 122. A chain 124, which meshes with the sprocket 122, is adapted to be connected to a motor (not shown) for rotating the driving shaft 114. The rotational movement of the drive shaft is transmitted by a turret drive, which is represented in the drawing by a box 118, to the turret. The turret drive 118 may be any suitable intermittent drive. One intermittent drive which may be used is shown in copending application Serial No. 474,563 filed December 10, 1954, of E. F. Nickl, now Patent No. 2,807,913, and assigned to the same assignee as the present application.

As indicated in Fig. 8, the detecting apparatus starts its operation after the drive shaft 114 has advanced about 220 degrees from a zero degree reference point. This zero degree reference point is chosen as the time when the intermittent turret drive 118 (graph line f in Fig. 8) starts its operation advancing each of the mold assemblies 22 one station. The first step in the detecting cycle is the lowering of the detector head 26 (graph line a). When the head is lowered, and a lead-in 14 wire has entered each of the passageways 28 in the head, the back pressure of air in the pneumatic switch 36 actuates the switch (graph line b). When the pneumatic switch 36 has been activated into its open position, the open circuit thus created prevents the hold relay 44 (and consequently the solenoid 54) from being actuated. The locking member 88 (Fig. 4) thus remains in place preventing the ejection of the lead-in wires of the mold assembly which was operated on by the detector head. However, if one or more of the lead-in wires 14 was either missing or bent, then air would escape from the detector head passageway 28 adjacent to the missing or bent wire. No back pressure would be built up within the head and, consequently, the pneumatic switch would not be activated. Then, while the head 26 is still lowered, and the drive shaft 114 continues to turn, a rise portion of the solenoid activation cam 126 (Fig. 7) engages a cam roller 127 on the solenoid activation switch 40 and momentarily actuates it. This is represented in Fig. 8 as line c. The momentary actuation of the solenoid activation switch 40 completes the circuit to the hold relay 44 which locks closed (Fig. 8, line d). This activates the solenoid 54 (Fig. 8, line g).

The intermittent turret drive 118 then rotates the turret (Fig. 8, line f) for an arcuate distance corresponding to the distance between the two successive stations. The mold assembly which was operated on by the detecting apparatus at station C has now been moved to station D. The drive shaft 114 continues to rotate and the ejector mechanism lowering cam 86 (Fig. 4) reaches a point where its dwell portion 94 reaches the ejector mechanism cam roller 90. Since the solenoid 54 is still activated the locking member 88 of the ejector mechanism is out of the way and the shaft 84 is lowered. This lowering, as explained above, results in the ejecting of the lead-in wires which were held in the mold 64. Then, after the ejector lowering cam 86 has rotated an amount sufficient to raise the shaft 84 back to its up position, a solenoid release cam 128 brings its dwell portion in registry with a release switch cam roller 129. This actuates the normally closed solenoid release switch 46 (Fig. 8, line j) opening the circuit to the hold relay 44. The solenoid is consequently deenergized, allowing the spring 89 to pull the locking member 88 back to its locked-in position, thus erasing the memory of the missing or bent lead-in wires.

Reference is made to Figs. 10 and 11 where there is illustrated another embodiment of the invention. If the lead-in wires of an electron tube stem having wires of different diameters, or having two lead-in wires in such close proximity that the pair of wires may be treated as a single wire of ellipsoidal cross-section, are to be detected by a single detector head, a greater amount of air is apt to escape through the detector head passageway for the larger diameter lead-in wires than through the other passageways. Consequently, the detector head may fail to detect a missing or bent smaller diameter lead-in wire. In order to insure that every one of the lead-in wires is subject to detection by the detector head, the smaller diameter lead-in wires and the larger diameter wires (or groups of wires having a large maximum cross-sectional extent) are detected by separate chambers of a detector head. The detector head 130 of Figs. 10 and 11 has two independent chambers 132 and 134 each having passageways, 136 and 138 respectively, for receiving lead-in wires having different cross sectional extents. In the embodiment shown in the drawing, the first chamber passageways 136 are each adapted to receive a single lead-in wire and the passageway 138 of the second chamber 134 is adapted to receive a pair of lead-in wires in relatively close proximity. Each of the chambers 132 and 134 is connected by an outlet, 140 and 142 respectively, to a separate pneumatic switch, 144 and 146 respectively, and a separate air volume regulator, 148 and 150 respectively. The two air volume regulators 148 and 150 are connected to the same air pressure regulator 152 which is in turn connected to the air supply (not shown).

It is apparent from the foregoing description that a novel and advantageous apparatus is provided for detecting the presence or absence of a workpiece in a machine adapted to process the same.

What is claimed is:

1. Pneumatic workpiece detecting apparatus comprising a head having a plurality of separate chambers and at least one passageway extending from the inside of each of said chambers to the outside of said head and each chamber adapted to be connected to a source of air under pressure for providing each of said chambers with a pressure higher than that on the outside thereof, said at least one passageway in one of said chambers having larger cross-sectional dimensions than a passageway in another of said chambers, a plurality of pressure responsive switches each connected to one of said chambers and adapted to be actuated by a predetermined pressure in said one of said chambers below that of air from said air source, a plurality of workpiece support elements, each alignable with said head and relatively movable with respect thereto, and means movable through each said support element to eject a workpiece from each support, each of portions of said head adjacent to a passageway being adapted to engage a workpiece thereagainst for at least partially sealing one of said chambers from communication with the outside of said head through the last named passageway; whereby the absence of a workpiece against any one of said portions of said head results in the reduction of air pressure to below said predetermined pressure and actuates one of said switches for moving said movable means and ejecting said workpieces from said support, and said head is adapted to engage workpieces of different sizes.

2. A workpiece processing machine comprising an intermittently rotatable turret; a plurality of workpiece holding assemblies mounted on said turret and spaced in a circle concentric therewith and adapted to travel a predetermined path; each of said workpiece holding assemblies having an apertured workpiece holding member and a workpiece ejector member having ejecting fingers extendable through the apertures in said holding member for removing a workpiece from said holding member; pneumatic detecting apparatus mounted adjacent to said path for detecting, during a period between successive intermittent movements of said turret, the presence of imperfect workpieces in said assemblies; and ejector member actuating apparatus for removing imperfect workpieces from said assemblies; said detecting apparatus comprising a hollow head having at least one passageway extending from the inside to the outside of said head and adapted to be connected to a source of air for providing the inside of said head with a pressure different from that on the outside thereof, and a pressure responsive switch connected to the inside of said head and adapted to be actuated by a predetermined pressure below that of air from said source, a portion of said head adjacent to said passageway being adapted to engage a portion of a workpiece thereagainst for at least partially sealing the inside of said head from the outside thereof, whereby the absence of a portion of a workpiece against said portion of said head results in the reduction of air pressure inside said head to said predetermined pressure thereby indicating the presence of an imperfect workpiece by actuating said switch; said ejector member actuating apparatus comprising a yoke spaced along said path from said detecting apparatus and engageable with the workpiece ejector members of each of said assemblies and responsive to said pressure responsive switch; and a memory system for delaying the actuation of said yoke by said switch, when said switch has been actuated, until the assembly operated on by said detecting apparatus has moved adjacent to said ejecting apparatus; whereby imperfect workpieces are detected and ejected from said machine.

3. A machine for making an electron tube stem; and comprising a rotatable turret, a workpiece holding assembly fixed to said turret and having a path of travel; imperfect workpiece detecting means positioned adjacent to said path of travel; imperfect workpiece ejecting means spaced along said path of travel from said detecting means; driving means for intermittently rotating said turret, whereby said turret is moved through a station for detecting imperfect workpieces and a station for ejecting imperfect workpieces; means connecting said detecting means to said driving means only during the intervals between rotational movements of said turret; means connecting said ejecting means to said driving means only during the intervals between rotational movements of said turret; and a memory system connected between said detecting means and said ejecting means for actuating said ejecting means, during the time said ejecting means is connected to said driving means, only when the assembly operated on by said detecting means has moved adjacent to said ejecting means; each of said assemblies having an apertured workpiece holding member and a workpiece ejector member having ejecting fingers extendable through the apertures in said holding member for removing a workpiece from said holding member; said detecting means comprising a hollow head having at least one passageway extending from the inside to the outside of said head and adapted to be connected to an air source for providing the inside of said head with a pressure different from that on the outside thereof, and a pressure responsive switch connected to the inside of said head and adapted to be actuated by a predetermined pressure below that of air from said source, the portion of said head adjacent to said passageway being adapted to engage a portion of a workpiece for at least partially sealing the inside of said head from the outside thereof, whereby the absence of a portion of a workpiece against said portion of said head results in the reduction of air pressure inside said head to said predetermined pressure thereby indicating the absence of a perfect workpiece by actuating said switch; said ejecting means comprising a yoke spaced along said path from said detecting means and engageable with the workpiece ejector members of each of said assemblies and responsive to said pressure responsive switch; said memory system delaying the actuation of said yoke by said switch, when said switch has been actuated, until the assembly operated on by said detecting apparatus has moved adjacent to said ejecting apparatus, whereby imperfect workpieces are detected and ejected from said machine.

4. A machine for making an electron tube stem; and comprising a rotatable turret, a workpiece holding assembly fixed to said turret and having a path of travel along successive stations; imperfect workpiece detecting means positioned adjacent to said path of travel; imperfect workpiece ejecting means spaced along said path of travel one station away from and subsequent to said detecting means; driving means for intermittently rotating said turret through successive arcs equal to the spacing between successive stations; whereby said turret is moved through a station for detecting imperfect workpieces and a station for ejecting imperfect workpieces; means connecting said detecting means to said driving means only during the intervals between rotational movements of said turret; means connecting said ejecting means to said driving means only during the intervals between rotational movements of said turret and only during periods before said detecting means is connected to said driving means; and a memory system connected between said detecting means and said ejecting means for actuating said ejecting means, during the time said ejecting means is connected to said driving means, only when the assembly operated on by said detecting means has moved adjacent to said ejecting means; each of said assemblies having an apertured workpiece holding member and a workpiece ejector member having ejecting fingers extendable through the apertures in said holding member for removing a workpiece from said holding member; said detecting means comprising a hollow head having at least one passageway extending from the inside to the outside of said head and adapted to be connected to an air source for providing the inside of said head with a pressure different from that on the outside thereof, and a pressure responsive switch connected to the inside of said head and adapted to be actuated by a predetermined pressure below that of air from said source, the portion of said head adjacent to said passageway being adapted to engage a portion of a workpiece for at least partially sealing the inside of said head from the outside thereof, whereby the absence of a portion of a workpiece against said portion of said head results in the reduction of air pressure inside said head to said predetermined pressure thereby indicating the absence of a perfect workpiece by actuating said switch; said memory system delaying the actuation of said yoke by said switch, when said switch has been actuated, until the assembly operated on by said detecting apparatus has moved adjacent to said ejecting apparatus; said memory system comprising a self-locking relay responsive to said switch; said relay, when energized, actuating said yoke only during the next successive period when said ejecting means is connected to said driving means; whereby imperfect workpieces are detected and ejected from said machine.

5. In a machine for making electron tube stems wherein a plurality of wires are positioned on a support and wherein all of said wires are ejected if at least one of said wires is bent or missing, an ejecting system comprising a vertical shaft, a plurality of fingers extending upwardly from the upper end of said shaft, a sleeve movable vertically on said shaft, said sleeve extending above said upper end and having a closure member at its upper end, said closure member having vertical passageways, said fingers extending into the lower portions of said passageways, the upper portions of said passageways being adapted to receive said wires, the upper ends of said fingers and said upper portions of said passageways comprising the support for said wires, a locking member movable into and out of a position wherein said sleeve is restrained from downward movement and means for moving said sleeve downwardly while restraining downward movement of said shaft, said means including a downwardly urged power transfer member, connected to said sleeve, and means comprising a pneumatic sensing system connected to said locking member for moving said locking member out of said position, whereby said power transfer member is free to move said sleeve downwardly.

6. An ejecting system according to claim 5 and wherein said pneumatic sensing system includes a solenoid connected to said locking member, a circuit connected to said solenoid for energizing said solenoid and moving said locking member to unlocked position, a relay across said circuit, a hollow sensing head having passageways adapted to receive the upper portions of straight ones only of said wires on said support, said head having a predetermined air pressure therewithin when one of said passageways is empty, said relay being responsive in closure to said predetermined air pressure, whereby said sleeve is free to move downwardly in response to said means for moving when one of said wires fails to enter one of said passageways and all of said wires are ejected from said support.

References Cited in the file of this patent
UNITED STATES PATENTS
2,696,107     Blaing-Leisk     Dec. 7, 1954